United States Patent [11] 3,620,338

[72] Inventors Yukio Tomita
70, Asahi-cho, 2-chome;
Shinichi Ito, 90-930, Ichigi-cho Yanda;
Yositaka Sogo, 10-1, Aza-Soskindo, Ohaza
Ohbayashi; Hideki Morino, 8, Toyota-cho,
all of Toyoda-shi, Japan
[21] Appl. No. 867,214
[22] Filed Oct. 17, 1969
[45] Patented Nov. 16, 1971
[32] Priorities Oct. 21, 1968
[33] Japan
[31] 43/76092;
Nov. 11, 1968, Japan, No. 43/82410

[54] SYNCHRONIZING SPEED CHANGE GEARS
8 Claims, 12 Drawing Figs.
[52] U.S. Cl...................................................... 192/53 F,
192/53 G, 192/108
[51] Int. Cl.......................................................F16d 23/10,
F16d 13/60
[50] Field of Search........................................... 192/53 B,
53 G, 53 F, 67 A, 108

[56] References Cited
UNITED STATES PATENTS
| 1,935,965 | 11/1933 | Wahlberg | 192/53 G X |
| 2,787,355 | 4/1957 | Dodge | 192/108 X |
| 2,801,721 | 8/1957 | Dodge | 192/53 F |
| 2,931,474 | 4/1960 | Zittrell et al. | 192/53 F X |
| 3,110,191 | 11/1963 | Schulze | 192/53 F X |
| 3,367,462 | 2/1968 | Bibbens | 192/108 X |

FOREIGN PATENTS
| 1,106,973 | 7/1955 | France | 192/G |

Primary Examiner—Allan D. Herrmann
Attorney—McGlew and Toren

ABSTRACT: A synchronizing speed change gear comprises a shaft, a gear wheel arranged loosely on the shaft, a toothed annular body arranged on the gear wheel and a gear shift sleeve rotatable with the shafts. The gear shift sleeve has teeth which upon an axial motion comes into meshed engagement with the teeth of the annular body to drivably connect it to the shaft. To limit the extent of the axial motion of the gear shift sleeve stops are provided by projections or shoulders formed on the sides of the teeth of the annular body or of the gear shift sleeve.

PATENTED NOV 16 1971 3,620,338

INVENTOR
YUKIO TOMITA
SHINICHI ITO
YOSHITAKA SOGO
HIDEKI MORINO

BY *McGlew Toren*

ATTORNEYS

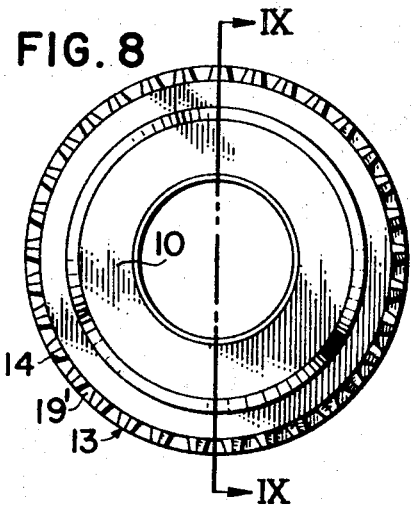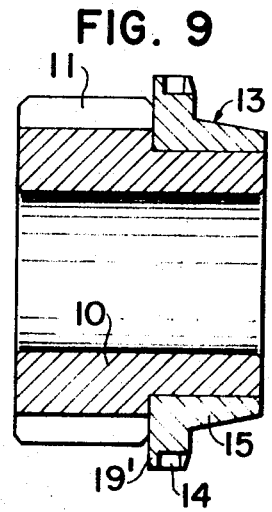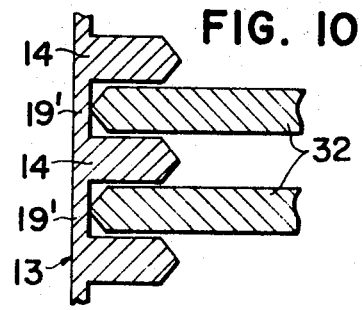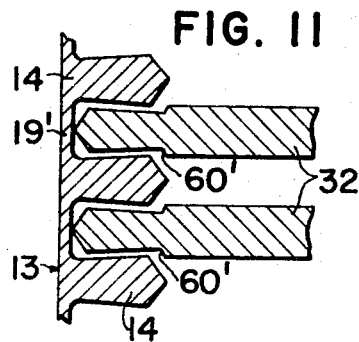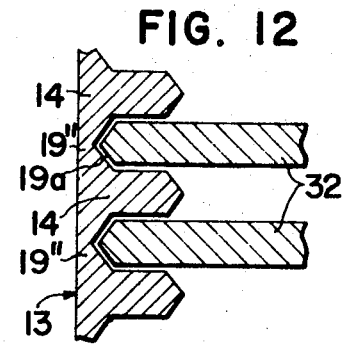

3,620,338

SYNCHRONIZING SPEED CHANGE GEARS

BACKGROUND OF THE INVENTION

The present invention relates to a synchronizing speed change gear, particularly for motor vehicles.

In a conventional synchronizing speed change gear having a shaft, a gear wheel arranged loosely on the shaft, a toothed annular body arranged on the gear wheel and a gear shift sleeve, the switching operation of the gear is carried out by shifting the gear shift sleeve by means of a gear shift lever in a direction substantially parallel to the shaft. The gear shift sleeve comes into toothed engagement with the toothed annular body thereby establishing a driving connection between the gear wheel and the shaft.

To prevent the gear shift sleeve from overshifting, there has been provided an annular disc at the end of the teeth of the annular body. The annular disc serves as a stop means for limiting the motion of the gear shift sleeve.

Such a synchronizing gear requires an additional annular disc as a stop means. The additional annular disc makes the assembly of the gear considerably complicated.

It is the principal object of the present invention to prevent the overshifting of the gear shift sleeve without the necessity for an additional component.

It is another object of the invention to simplify the assembly of the gear.

It is a further object of the invention to provide stop means capable of being formed simultaneously with the machining of the teeth of the annular body or of the gear shift sleeve.

SUMMARY OF THE INVENTION

In accordance with the invention, on the sides of the tooth of the annular body or of the gear shift sleeve there are formed integrally catch members which serve as stop means for limiting the motion of the gear shift sleeve in a direction substantially parallel to the shaft.

The catch members may be side projections formed at the ends of the teeth of the annular body. Those projections may be formed either on each of the teeth or on several groups thereof at angular intervals. The side projections of adjoining teeth may be formed integral with each other.

The catch members may also be shoulders formed on the sides of the teeth of the gear shift sleeve.

BRIEF DESCRIPTION OF THE DRAWINGS

In the drawings:

FIG. 8 is an elevation of another embodiment;
FIG. 9 is a longitudinal section taken along the line IX—IX of FIG. 8;
and
FIGS. 10 to 12 are views of other variations similar to FIG. 6.

DESCRIPTION OF THE PREFERRED EMBODIMENTS

Figure 1:
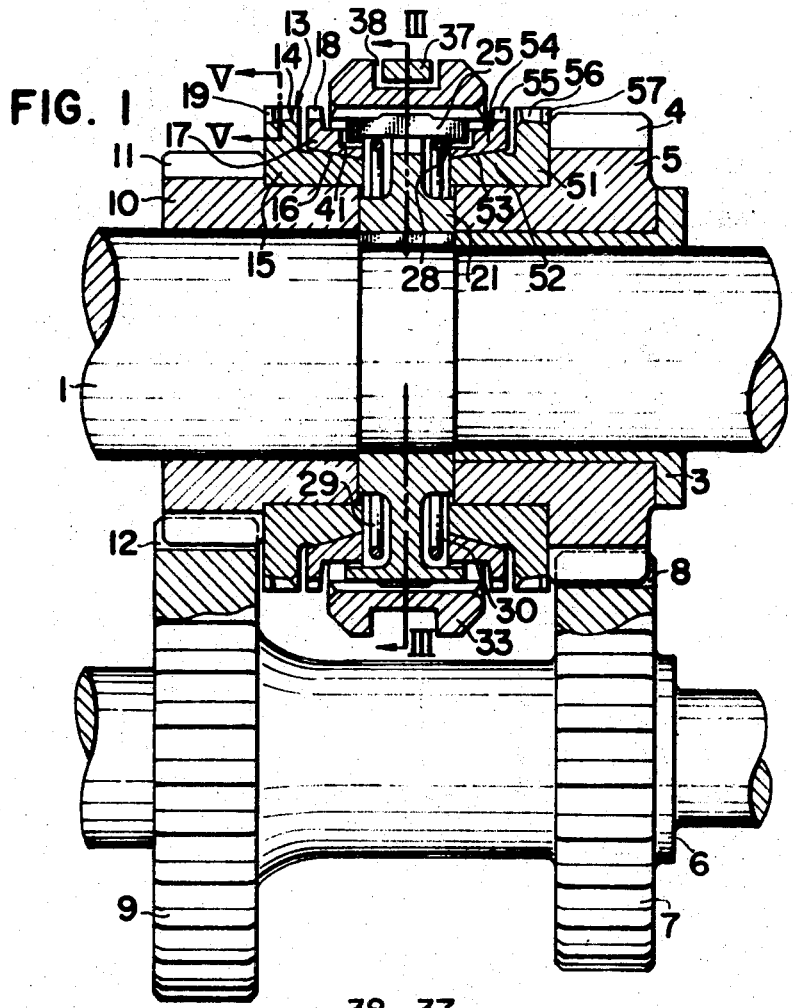
FIG. 1 is a sectional elevation of a synchronizing gear according to the present invention shown in the neutral position.

Referring now to FIG. 1, a first shaft 1, which may be the output shaft of a synchronizing gearing, carries a sleeve 3 on which a gear wheel 5 having a toothing 4 (referred hereinafter to as the second gear wheel) is rotatably arranged. The toothing 4 of the second gear wheel 5 engages a toothing 8 provided on the circumference of a gear wheel 7 (referred hereinafter to as the third gear wheel) secured on a second shaft 6 which in turn is arranged parallel to the first shaft 1.

The second shaft 6, which is driven by the engine (not shown), carries a gear wheel 9 (referred hereinafter to as the fourth gear wheel). The fourth gear wheel 9 is arranged in parallel to the third gear wheel 7 and has a toothing 12 engaging a toothing 11 of a gear wheel 10 (referred hereinafter to as the first gear wheel) arranged rotatably on the first shaft 1.

A first toothed annular body 13 is secured on the hub portion of the first gear wheel 10 so as to rotate therewith. The teeth 14 formed on the circumference of the annular body 13 are arranged in alignment with circumferential teeth 18 of an annular member 17 (referred hereinafter to as the synchronizing ring) having a conical inner surface 16 adapted to engage a conically shaped hub portion 15 of the toothed annular body 13.

Figure 3:
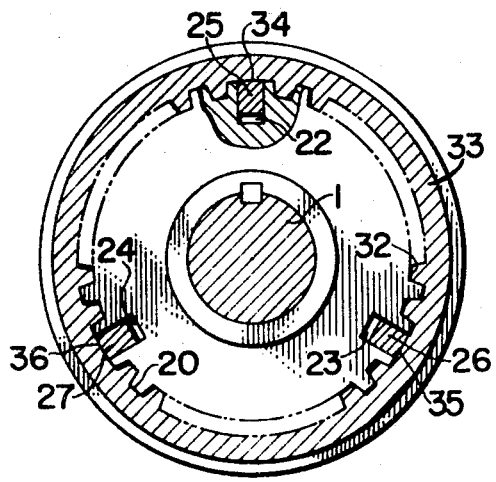
FIG. 3 is a cross section taken along the line III—III of FIG. 1.

A hub member 21 having circumferential teeth 20 is secured on the first shaft 1 so as to rotate therewith. The hub member 21 is formed with three circumferential recesses 22, 23, 24 which are arranged in an angular distance of 120° from one another, as shown in FIG. 3. In each of these recesses 22, 23, 24 there is a loosely fitted key member 25, 26, 27, respectively.

Spring rings 29 and 30 urge the key members 25, 26, 27 outwardly so that these keys 25, 26, 27 are received in the corresponding inner recesses 34, 35, 36 of a gear shift sleeve 33 having inner teeth 32 in engagement relationship with the teeth 20 of the hub member 21. The circumference of the gear shift sleeve 33 is formed with an annular groove 38 for engagement of a fork 37 of a gear shift lever (not shown).

Figure 4:
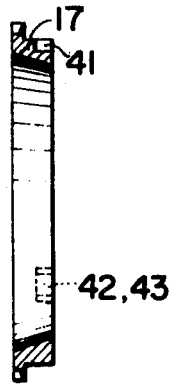
FIG. 4 is a diametric sectional view through a synchronizing ring in FIG. 1.

The synchronizing ring 17 is formed with three circumferential recesses 41, 42, 43 corresponding, respectively, to the circumferential recesses 22, 23, 24 of the hub member 21 and forming continuations thereof (FIG. 4). Thus the circumferential recesses 22–24 and 41–43 may be brought into engagement with the keys 25–27 in an operative position of the gear.

Similarly, a second toothed annular body 51 is secured on the second gear wheel 5 so as to rotate therewith. The second toothed annular body 51 has a conically shaped hub portion 52 and is formed with circumferential teeth 56 arranged in alignment with circumferential teeth 55 of an annular member 54 (referred hereinafter to as the synchronizing ring) having a conical inner surface 53 adapted to engage said hub portion 52. The synchronizing ring 54 is formed with three circumferential recesses in the same manner as in the synchronizing ring 17.

Figure 5:
FIG. 5 is a cross section taken along the line V—V of FIG. 1.
Figure 6:
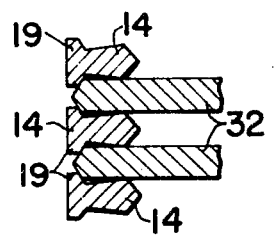
FIG. 6 is a section taken along VI—VI of FIG. 5.

As stop means for limiting the motion of the gear shift sleeve 33 toward the left parallel to the first shaft 1 there are formed projections 19 on both sides of either all or several of the teeth 14 of the annular body 13 near the extremity thereof (FIGS. 5 and 6). These projections 19 protrude in a direction of the thickness of the teeth 14. The working of the projections 19 may be performed either in succession to or simultaneously with that of the teeth 14. Similar projections 57 as stop means are formed at the right ends of the teeth 56 of the second annular body 51.

Figure 2:
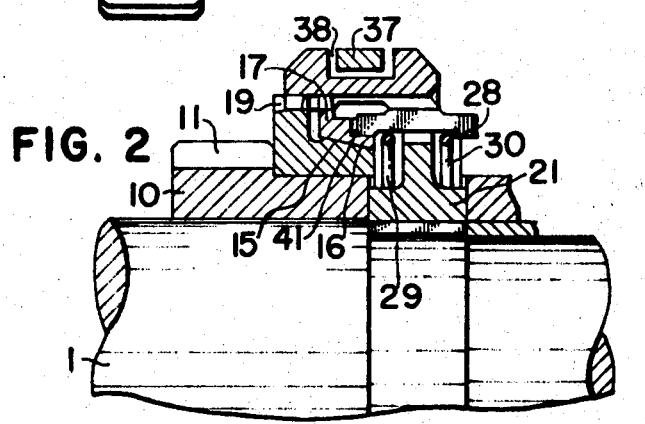
FIG. 2 is a sectional elevation of parts of FIG. 1 in an operative position.

The operation of this device described above is as follows:

When the gear shift sleeve 33 is shifted from its neutral position shown in FIG. 1 toward the left by actuating the gear shift lever (not shown), the synchronizing ring 17, whose conical inner surface 16 abuts against the conically shaped hub portion 15 of the first toothed annular body 13, rotates at the same speed as the first toothed annular body 13 so that the teeth 14 of the first toothed annular body 13 and the teeth 18 of the synchronizing ring 17 in alignment with each other allow the gear shift sleeve 33 to reach the position shown in FIG. 2 so that a driving connection between the first gear wheel 10 and the first shaft 1 is established.

However, the shifting of the gear shift sleeve 33 beyond its extreme position is prevented by that its inner teeth 32 abut against the side projections 19 of the teeth 14 of the first toothed annular body 13. Consequently, the shifting of the gear shift sleeve 33 toward the left in parallel to the first shaft 1 is limited, because the side projections 19 act as stop means for the shifting of the gear shift sleeve 33.

A driving connection between the second gear wheel 5 and the first shaft 1 is established in a similar manner.

Figure 7:
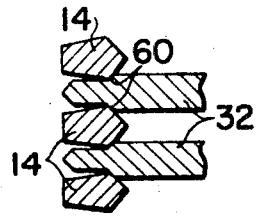
FIG. 7 is a variation of FIG. 6.

In FIG. 7, the teeth 14 of the first toothed annular body 13 are not formed with side projections, and the inner teeth 32 of the gear shift sleeve 33 are formed on both sides thereof with shoulders 60 which upon engagement with the teeth 14 limit the shifting of the gear shift sleeve.

The shoulders 60 as stop means may also be formed simultaneously with the machining of the inner teeth of the gear shift sleeve.

In a modification shown in FIGS. 8 to 10, side projections as stop means of the respective adjoining teeth 14 are formed integral with each other as denoted at 19'. This structure has the advantage of standing a powerful shifting of the gear shift sleeve.

The sides at the engaging portions of the teeth 14 and 32 in FIG. 11 are additionally tapered so as to prevent the teeth 32 from coming out of engagement with the teeth 14 in the operating position of the gear shift sleeve 33.

Stop means 19" at the extremity of the teeth 14 shown in FIG. 12 are shaped in conformity with the edges of the teeth 32 on the inner circumferential surfaces of gear shift sleeve 33. Thus the axial force upon operation of the gear shift sleeve is distributed on the face of the stop means 19" so that the reliability in strength of the stop means is considerably improved.

It is to be understood that many modifications may be made without departing from the spirit of the present invention.

What is claimed is:

1. A synchronizing speed change gear comprising, in combination, a shaft; a gear wheel rotatably mounted on said shaft; a hub member secured to rotate with said shaft and positioned axially adjacent said gear wheel, said hub member having gear teeth on the external circumferential periphery; a gear shift sleeve having gear teeth on its internal circumferential periphery meshing with the teeth on said hub member, said gear shift sleeve being mounted for axial displacement relative to said hub member from a neutral position to a gear shifting position; an annular body secured to rotate with said gear wheel and having gear teeth on the external circumferential periphery meshing with the teeth on said gear shift sleeve upon axial movement of said gear shift sleeve in the gear shifting direction; a synchronizing ring positioned axially between said hub member and said annular body and having gear teeth on its external periphery meshing with the gear teeth on said gear shift sleeve upon axial displacement of said gear shift sleeve in the gear shifting direction to couple said hub member in driving relation with said annular body; and stop means formed integrally with those axial end faces of the teeth, of one of said annular body and said gear shift sleeve, more remote from the other of said annular body and said gear shift sleeve, said stop means extending circumferentially into the intertooth spaces between circumferentially adjacent teeth and being engageable with the teeth of the other of said annular body and said gear shift sleeve entering into said intertooth spaces upon axial displacement of said gear shift sleeve, to limit the actual displacement of said gear shift sleeve from neutral in the gear shifting direction to prevent over travel of said gear shift sleeve.

2. A synchronizing speed change gear, as set forth in claim 1, wherein the facing lateral surfaces of the teeth on said annular body and the teeth on said gear shift sleeve are tapered in parallel relation so that the teeth on said gear shift sleeve are prevented from disengagement with the teeth on said annular body in the gear shifting position of said gear shift sleeve.

3. A synchronizing speed change gear, as set forth in claim 1, wherein the axial end portions of the teeth of said gear shift sleeve facing the teeth of said annular body have a reduced thickness relative to the remaining parts of the teeth of said gear shift sleeve; said remaining parts having a thickness greater than the intertooth spacing of the teeth of said annular body to form shoulders on the teeth of said gear shift sleeve engageable with the teeth of said annular body, in the gear shifting position of said gear shift sleeve, to constitute said stop means.

4. A synchronizing speed change gear, as set forth in claim 1 wherein said stop means comprise projections on the outer axial end faces of the teeth of said annular body, said projections extending circumferentially into the intertooth spaces of said annular body to limit axial movement of the teeth of said gear shift lever upon movement of said gear shift lever in the gear shifting direction.

5. A synchronizing speed change gear, as set forth in claim 4, wherein said projections on adjacent teeth on said annular body extend completely across said intertooth spaces to form a continuous circumferential wall.

6. A synchronizing speed change gear, as set forth in claim 4, wherein said projections on adjacent teeth on said annular body are disposed in circumferentially spaced relationship.

7. A synchronizing speed change gear, as set forth in claim 6, in which those axial end surfaces of the teeth on said gear shift sleeve facing said annular body are formed as radial ridges which, upon movement of said gear shift sleeve in the gear shifting direction, enter into the circumferential spaces between adjacent projections on the teeth of said annular body to engage said circumferentially adjacent projections.

8. A synchronizing speed change gear, as set forth in claim 4, wherein the axially interengageable surfaces of said projections and of said teeth on said gear shift sleeve are tapered to interfit one into the other in surface contacting relationship.

* * * * *